United States Patent [19]

Huang

[11] Patent Number: 5,535,851
[45] Date of Patent: Jul. 16, 1996

[54] COMBINATION STRUCTURE OF A PROTECTIVE COVER, CUP STRUCTURE AND MACHINE BODY OF AN AIR PRESSURE ADJUSTING DEVICE

[76] Inventor: Fu-Shiang Huang, 46-1 Kan-Tou, 3 Lin, Jui–Shin Chun, Shin–Feng Hsiang, Hsing-Chu Hsien, Taiwan

[21] Appl. No.: 379,983

[22] Filed: Jan. 27, 1995

[51] Int. Cl.$^6$ .................................................. F16N 7/34
[52] U.S. Cl. ........................... 184/55.100; 184/55.2; 220/402; 220/408; 261/72.1; 261/78.1
[58] Field of Search .................................. 184/55.1, 55.2, 184/57, 58, 59; 239/302, 337; 261/72.1, 78.1; 220/402, 408, 581; 403/13, 225, 226

[56] References Cited

U.S. PATENT DOCUMENTS 1,750,070  3/1930  Tuttle ........................... 184/55.2
3,087,645  4/1963  Eddy et al. ..................... 220/402
3,905,511  9/1975  Groendal ........................ 220/408
4,735,288  4/1988  Uematsu et al. ................ 184/55.2

FOREIGN PATENT DOCUMENTS 8402560  7/1984  WIPO ............................. 403/13

Primary Examiner—Edward K. Look
Assistant Examiner—Christopher Verdier
Attorney, Agent, or Firm—Bacon & Thomas

[57]                    ABSTRACT

A combination of a protective cover, a cup structure and a machine body of an air pressure adjusting device, having a resilient pad on a bottom face of the protective cover, and the cup body is mounted within the cover. An external wall of the cup body and the inner wall of the protective cover are engaged with each other by a protruding strip engaging a guiding slot, and a protrusion extending into a positioning hole. The external bottom face of the cup body is provided with a protrusion extending into a hole in the protective cover.

2 Claims, 4 Drawing Sheets

COMBINATION STRUCTURE OF A PROTECTIVE COVER, CUP STRUCTURE AND MACHINE BODY OF AN AIR PRESSURE ADJUSTING DEVICE

FIELD OF THE INVENTION

The present invention relates to a combination of a protective cover, a cup structure and a machine body for an air pressure adjusting device, in particular to a cup body which can prevent the dislocation of the cup body as a result of mechanical vibration and the aging of the material.

BACKGROUND OF THE INVENTION

All mechanical parts of a pneumatic tool are provided with high pressure air by means of an air compressor. owing to the fact that the compressed air may be contaminated by various types of external materials, such as water droplets, dust, oil residue from the compressor, rust, and scale, etc., the control of the air pressure may be thus interrupted. Therefore, a device is needed to remove the contaminants in order to ensure normal operation of the components of the pneumatic devices. The present module is a device mounted between the air compressor and the pneumatic device.

An air pressure adjusting module includes a filtering means, an adjusting device and an oil supplying device such that the air passes through the filtering means and adjusting device and then enters the oil supply device.

Conventional air pressure adjusting devices one of the following two types:

As shown in FIG. 4, the open end of cup body A is provided with a protrusion A1. A screw cap B is provided with screw thread B1 and has a hole B2 which receives the cup body A therethrough. In combination, the cup body A passes through the hole B2 and is then locked at the external screw thread C such that the cup body A is mounted on the device. As shown in FIG. 5, the open end of cup body A is provided with external teeth A2 and then directly mounted to the inner thread D of the body.

These conventional types of cups have the following drawbacks:

(1) The cup body is easily breakable due to the aging effect of the plastic material of the cup.
(2) The internal pressure of the cup body as a result of constant vibration of the device will cause dislocation of the cup.
(3) The vibration of the device causes the disengagement of the thread connection between the cup body and the device.

SUMMARY OF THE INVENTION

It is an object of the present invention to provide a combination of a protective cover, cup structure and a body of an air pressure adjusting device, wherein a protruding lug of the protective cover is snapped onto a fastening slot of the body.

It is another object of the present invention to provide a combination structure of a protective cover, a cup structure and a body of an air pressure adjusting device, wherein an elastic cup pad is provided in between the cup structure and the protective cover such that the cup pad positions the cup body and absorbs vibration.

It is another object of the present invention to provide a combination of a protective cover, a cup structure and a body of an air pressure adjusting device, wherein the cup structure will not be broken as a result of external physical impact.

Yet another object of the present invention is to provide a combination of a protective cover, a cup structure and a body of an air pressure adjusting device, wherein the cup body is used as a container for lubrication oil.

BRIEF DESCRIPTION OF THE DRAWINGS

The present invention will be better understood from the following description of a preferred embodiment of the present invention, with reference to the attached drawings, wherein.

DETAILED DESCRIPTION OF THE PREFERRED EMBODIMENT

Figure 1:
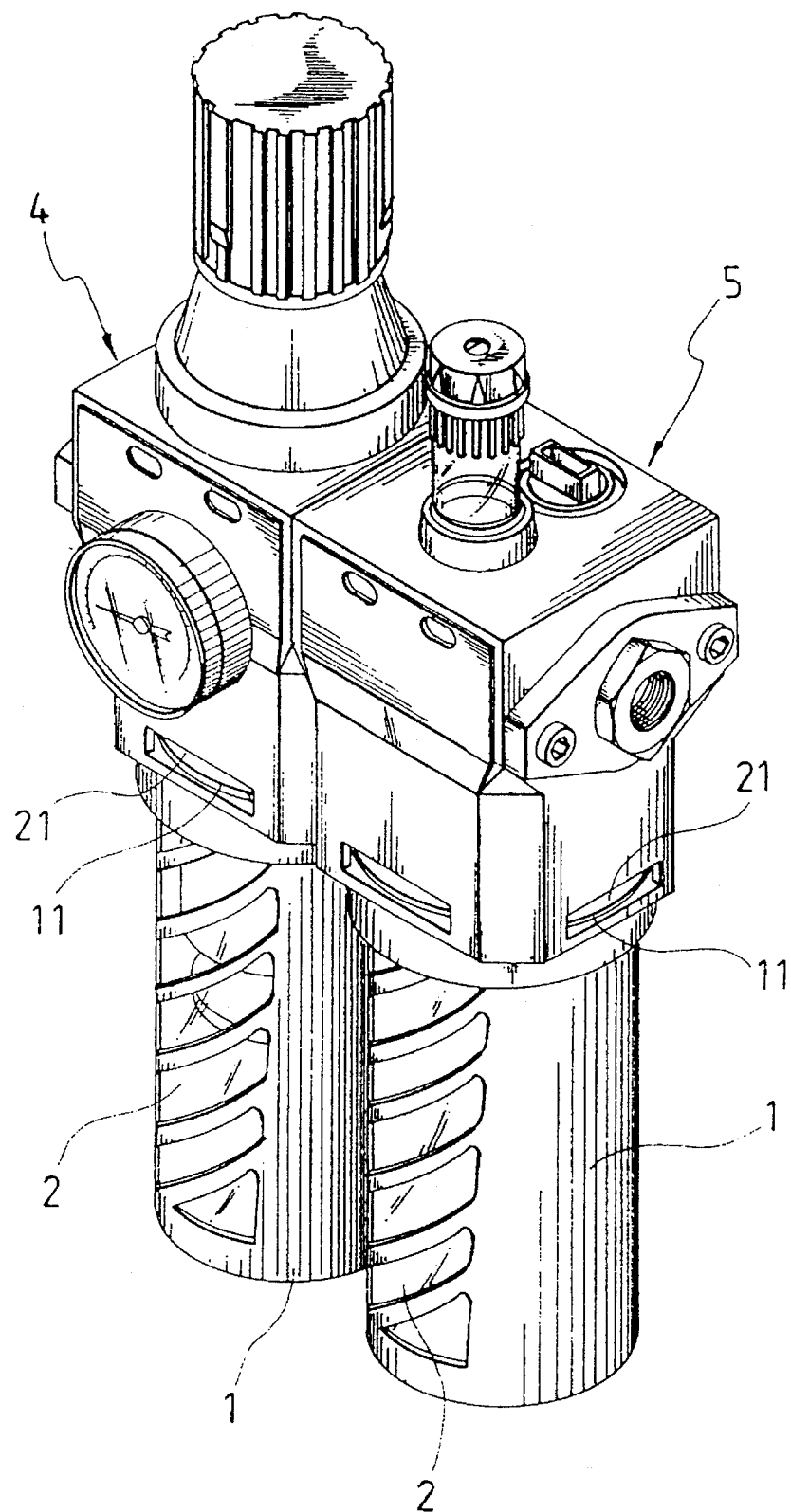
FIG. 1 is a perspective view of an air pressure adjusting device in combination with a cup body.

As shown in FIG. 1, a combination structure of a protective cover, a cup structure and a body of an air pressure adjusting device constructed in accordance with the present invention is illustrated to be mounted between an air compressor and a pneumatic tool. The air pressure adjusting device comprises a filtering-pressure adjusting device body and an oil supplying device. An air pressure adjusting means is mounted at the upper end of the filtering-pressure adjusting device, and a filtering means is provided within the interior of the filtering-pressure adjusting device. The cup mounted at the lower end of the filtering-pressure adjusting device can be mounted within the filtering means. At the same time, the compressed air is circulated within the interior of the device. The air after passing through the filtering means with the dust being removed will enter the pressure adjusting device so as to adjust or to keep a steady flow and a uniform pressure. After that, it flows into the oil supplying device.

The top end of the oil supplying device is provided with an oil adjusting device. An oil leading tube is connected to the oil adjusting device and extends into the lubrication oil within the cup. The oil adjusting device is extended with a nozzle along the oil path to the device. The oil adjusting device controls the amount of lubrication oil flowing into the inner chamber of the device.

The air pressure adjusting device comprises a filtering-pressure adjusting device 4 and an oil supplying device 5. The compressed air passes through the inlet of the filtering-pressure adjusting device 4 and discharges through the outlet of the oil supplying device 5. The water content and debris within the air will be removed when the air passes through the filtering-pressure adjusting device 4 and then directed into the oil supplying device 5. The compressed air mixed with the atomized lubrication oil will then be delivered to pneumatic tools.

Figure 2:
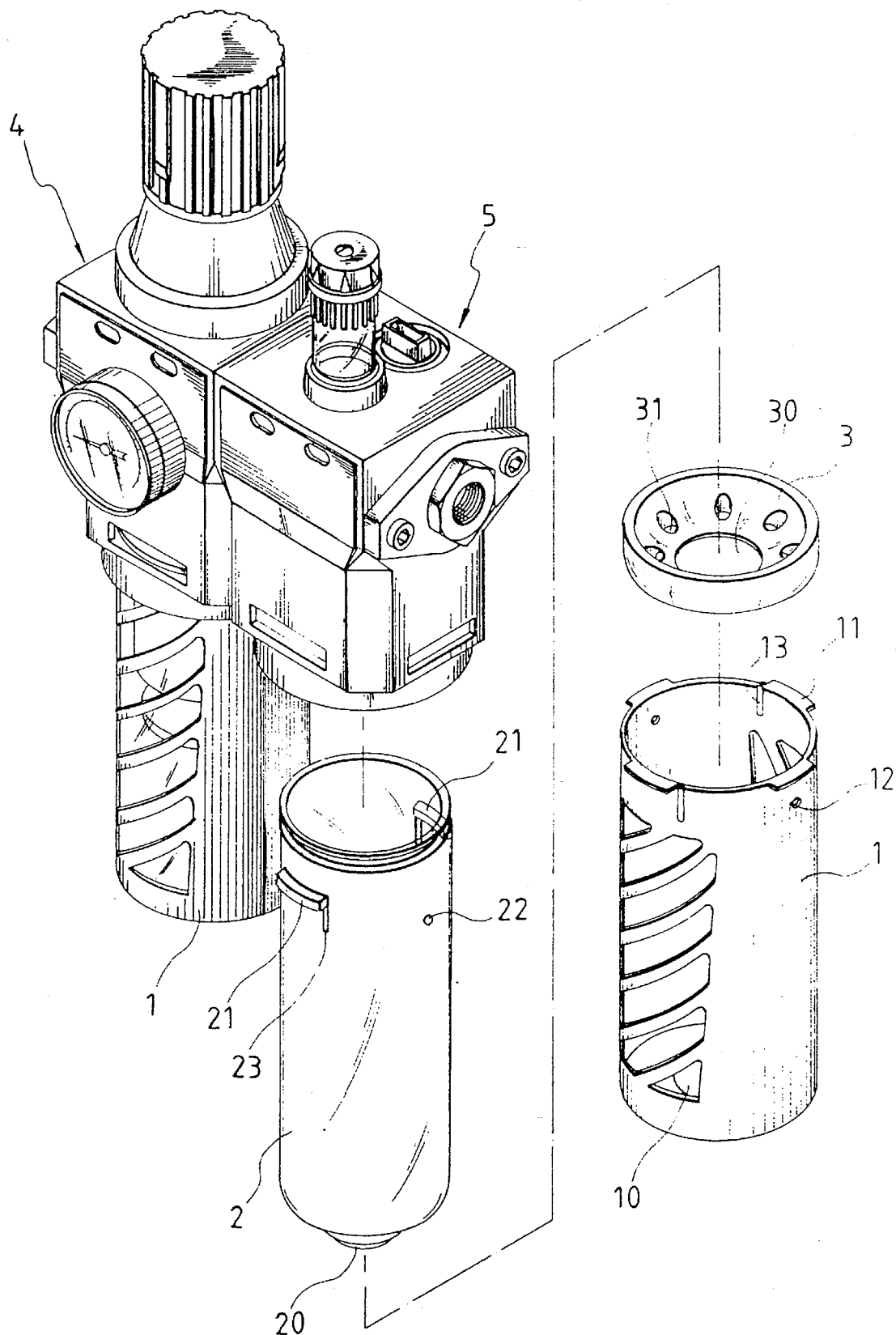
FIG. 2 is an exploded, perspective view of an air pressure adjusting device showing the detachment of the cup body.

As shown in FIG. 2, the present preferred embodiment comprises a protective cover 1, a cup body 2 and a cup pad 3. The protective cover 1 is made from rigid metallic material, for example, steel. The lower protruding lug 11 can combine with the rigid device body and support other parts. Due to its rigidity, it provides an anti-explosion function. A guiding slot 13 is provided on the upper edge of the inner diameter of the protective cover 1. A hole 12 is provided oppositely on the protective cover 1 and the bottom section is provided with a through hole 10. The upper edge is provided with four lower protruding lugs 11 which are uniformly distributed along the edge. The cup pad 3 is made of elastic material, for example rubber, plastic, etc. The external diameter corresponds to the inner diameter of the protective cover 1 and can be directly mounted on the bottom face of the protective cover 1. The center region of the pad 3 is provided with a positioning hole 30 and the surrounding region thereof is provided with a plurality of holes 31. The cup body 2 is formed by injection molding of thermoplastic material and the external diameter is smaller than the inner diameter of the protective cover 1. At the external surface of the cup body 2, protruding strips 23 are provided and are located corresponding to the two guiding slots 13 of the protective cover 1. Protrusions 22 are provided on the external surface thereof to correspond to the two positioning holes 12 of the protective cover. The bottom face is provided with the protruded section 20 corresponding to the positioning hole 30 of the cup pad 3. At the appropriate position of the external wall of the cup body, an upper protruding lug 21 is provided to correspond to the lower protruding lug 11. The bottom section of the cup body 2 is shaped corresponding to the inner bottom face of the cup pad 3 such that the bottom section of the cup body 2 and the cup pad 3 can be closely combined together.

Figure 3:
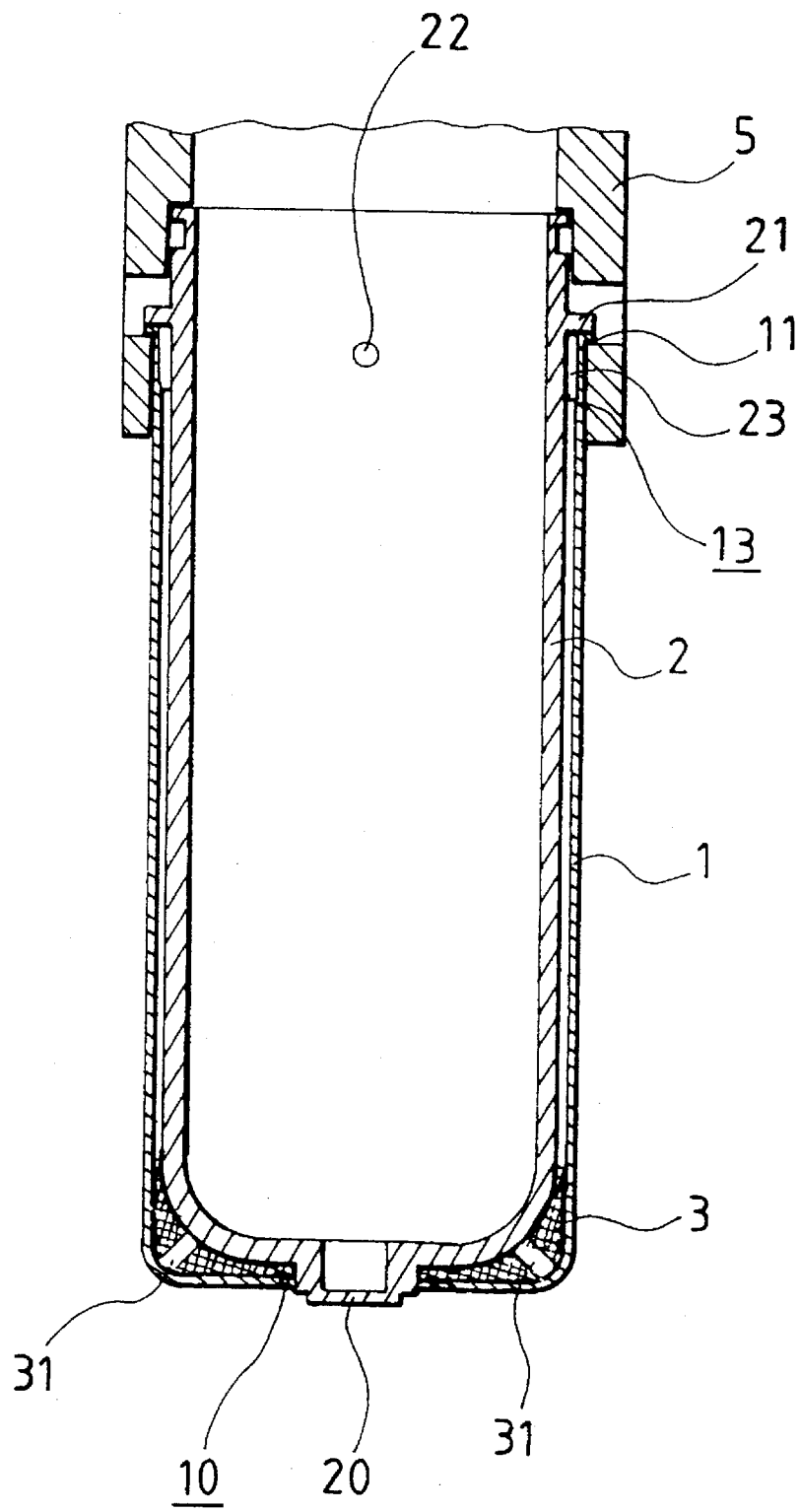
FIG. 3 is a cross-sectional view of a cup body in accordance with the present invention.
Figure 4:
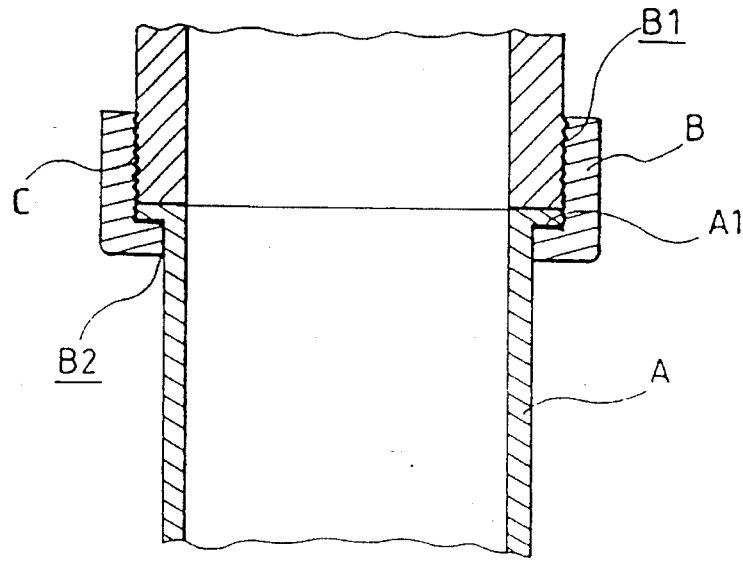
FIG. 4 is a cross-sectional view of a prior art cup body, showing the rotatable engagement of the cup body with the oil faltering device.
Figure 5:
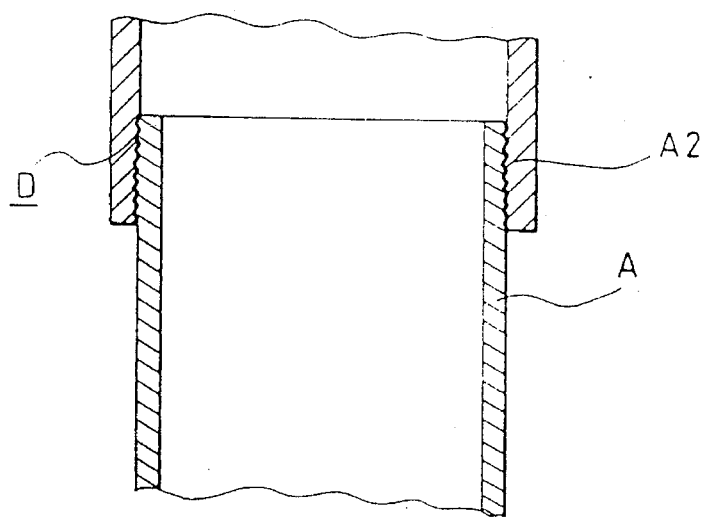
FIG. 5 shows another prior art cup body which is directly engaged with the oil filtering device.

As shown in FIG. 3, when the cup body 2 is to be assembled, the cup pad 3 is first mounted to the inner bottom face of the protective cover 1. At this instance, the positioning hole 30 of the cup pad 3 is aligned with the through hole 10 of the protective cover 1. After that, the cup body 2 is inserted into the protective cover 1. During the mounting operation, the protruding strip 23 of the cup body 2 is inserted along the guiding slot 13 of the protective cover 1 and then, the protrusion 22 of the cup body 2 is mounted within the positioning hole 12 of the protective cover 1. At the same time, the protruded section 20 of the cup body 2 passes through the positioning hole 30 of the cup pad 3 and the hole 10 of the protective cover 1. At this time, the protective cover 1, the cup body 2 and the cup pad 3 are firmly mounted together. The upper protruding lug 21 and the lower protruding lug 11 of the cup body 2 are closely overlapped. The upper and lower protruding lugs 21, 11, together are inserted into slots in the device body. This can be used for the containing of lubrication oil or as the elastic buffering for air pressure. Changes and modifications in the specifically described embodiment can be carded out without departing from the scope of the invention, which is intended to be limited only by the scope of the appended claims.

What is claimed is:

1. A combination structure of a protective cover, a cup body and a device body of an air pressure adjusting device, comprising:

(a) a generally cylindrical protective cover having an open end, a second end and a plurality of guiding slots extending inwardly from the open end end at least one positioning hole;

(b) a cup having a plurality of protruding strips located so as to engage the guiding slots of the protective cover, at least one protrusion on the cup located so as to engage the at least one positioning hole of said protective cover;

(c) a vibration absorbing elastic cup pad located on the second end of said protective cover in contact with said protective cover and said cup having a positioning mounting hole at a center of said pad.

2. The combination structure as set forth in claim 1, wherein a plurality of holes are provided in the vibration absorbing cup pad.

* * * * *